(12) United States Patent
Smith et al.

(10) Patent No.: US 8,135,540 B2
(45) Date of Patent: Mar. 13, 2012

(54) METHODS AND SYSTEMS FOR DETERMINING A TELECOMMUNICATIONS SERVICE LOCATION USING GLOBAL SATELLITE POSITIONING

(75) Inventors: Steven G. Smith, Roswell, GA (US); Robert H. Willis, Jr., Louisville, KY (US); Mitchell E. Davis, Palmetto, GA (US); Marvin R. Hamrick, Watkinsville, GA (US); Roland T. Morton, Jr., Alpharetta, GA (US); Jeffery A. Sylvester, Dallas, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/649,166

(22) Filed: Dec. 29, 2009

(65) Prior Publication Data

US 2010/0134355 A1    Jun. 3, 2010

Related U.S. Application Data

(63) Continuation of application No. 11/935,749, filed on Nov. 6, 2007, now Pat. No. 7,647,172, which is a continuation of application No. 11/637,659, filed on Dec. 12, 2006, now Pat. No. 7,292,939, which is a continuation of application No. 10/445,861, filed on May 27, 2003, now Pat. No. 7,188,027, which is a continuation of application No. 10/032,853, filed on Oct. 25, 2001, now Pat. No. 6,772,064.

(51) Int. Cl.
*G01C 21/00* (2006.01)

(52) U.S. Cl. .......................... 701/213; 701/207; 701/214

(58) Field of Classification Search .................. 701/201, 701/207, 213, 214; 342/357.06, 357.09
See application file for complete search history.

(56) References Cited

U.S. PATENT DOCUMENTS

| | | | |
|---|---|---|---|
| 4,841,560 | A | 6/1989 | Chan et al. |
| 4,922,516 | A | 5/1990 | Butler et al. |
| 4,977,399 | A | 12/1990 | Price et al. |
| 5,666,481 | A | 9/1997 | Lewis |
| 5,687,212 | A | 11/1997 | Kinser, Jr. et al. |

(Continued)

FOREIGN PATENT DOCUMENTS

EP     0712227 A2     5/1996

(Continued)

*Primary Examiner* — Gertrude Arthur Jeanglaude
(74) *Attorney, Agent, or Firm* — Parks IP Law LLC; Mickki D. Murray, Esq.

(57) ABSTRACT

Methods and systems are provided for obtaining information related to a customer service location and directions for routing a service technician from one customer service location to another. One embodiment includes requesting at least one set of coordinates associated with the customer service location; accessing a technician server to direct a global satellite positioning system to obtain the set of coordinates for the customer service location; obtaining the coordinates and updating one or more databases with said coordinates. The coordinates may include at least one of a latitude and a longitude associated with the customer service location. Another embodiment includes obtaining through a technician server at least one set of "from" coordinates associated with the first customer service location and at least one set of "to" coordinates associated with the second customer location; transmitting the "from" and "to" coordinates to a mapping system; and, generating directions in the mapping system based on the "to" and "from" coordinates. At least one of the sets of coordinates includes latitude and longitude data. System and computer-readable media embodiments of these methods are also provided.

20 Claims, 5 Drawing Sheets

U.S. PATENT DOCUMENTS

| | | | |
|---|---|---|---|
| 5,798,733 | A | 8/1998 | Ethridge |
| 5,880,958 | A | 3/1999 | Helms et al. |
| 5,881,131 | A | 3/1999 | Farris et al. |
| 5,896,440 | A | 4/1999 | Reed et al. |
| 5,897,640 | A | 4/1999 | Veghte et al. |
| 5,920,846 | A | 7/1999 | Storch et al. |
| 5,922,040 | A | 7/1999 | Prabhakaran |
| 5,987,381 | A | 11/1999 | Oshizawa |
| 6,101,443 | A | 8/2000 | Kato et al. |
| 6,141,609 | A | 10/2000 | Herdeg et al. |
| 6,154,152 | A | 11/2000 | Ito |
| 6,167,255 | A | 12/2000 | Kennedy, III et al. |
| 6,185,484 | B1 | 2/2001 | Rhinehart |
| 6,192,314 | B1 | 2/2001 | Khavakh et al. |
| 6,246,361 | B1 | 6/2001 | Weill et al. |
| 6,285,931 | B1 | 9/2001 | Hattori et al. |
| 6,321,161 | B1 * | 11/2001 | Herbst et al. ................. 701/210 |
| 6,332,163 | B1 | 12/2001 | Bowman-Amuah |
| 6,343,290 | B1 | 1/2002 | Cossins et al. |
| 6,389,426 | B1 | 5/2002 | Turnbull et al. |
| 6,427,119 | B1 | 7/2002 | Stefan et al. |
| 6,430,562 | B1 | 8/2002 | Kardos et al. |
| 6,477,526 | B2 | 11/2002 | Hayashi et al. |
| 6,484,092 | B2 | 11/2002 | Seibel |
| 6,505,120 | B2 | 1/2003 | Yamashita et al. |
| 6,516,055 | B1 | 2/2003 | Bedeski et al. |
| 6,526,349 | B2 | 2/2003 | Bullock et al. |
| 6,532,418 | B2 | 3/2003 | Chun et al. |
| 6,754,582 | B1 | 6/2004 | Smith et al. |
| 6,772,064 | B1 | 8/2004 | Smith et al. |
| 7,103,476 | B2 | 9/2006 | Smith et al. |
| 7,188,027 | B2 | 3/2007 | Smith et al. |
| 7,292,939 | B2 | 11/2007 | Smith et al. |
| 2002/0077889 | A1 * | 6/2002 | Kolls ............................. 705/14 |
| 2005/0222764 | A1 * | 10/2005 | Uyeki et al. .................. 701/210 |

FOREIGN PATENT DOCUMENTS

| | | |
|---|---|---|
| EP | 0712227 A3 | 11/1999 |
| WO | 0002365 | 1/2000 |

* cited by examiner

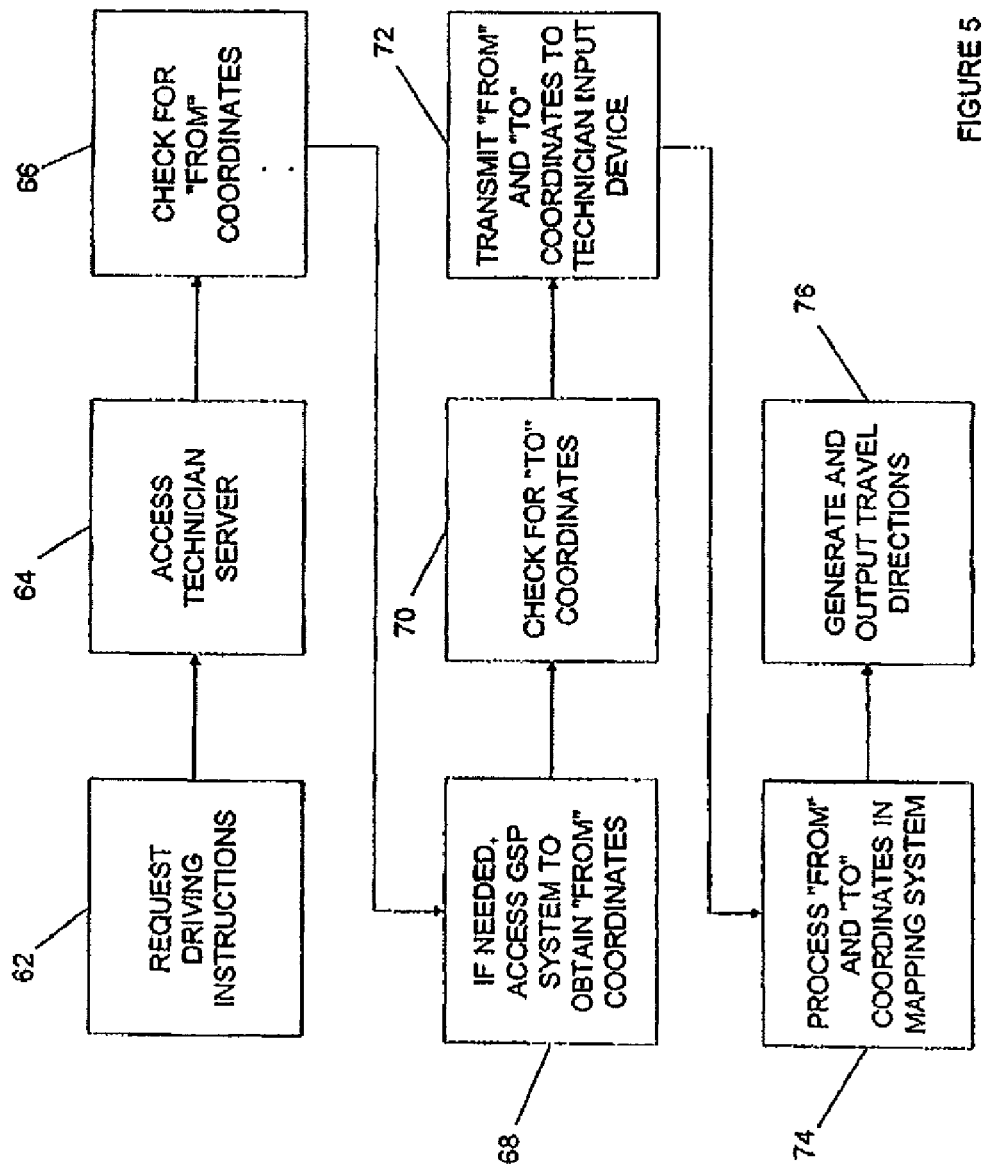

METHODS AND SYSTEMS FOR DETERMINING A TELECOMMUNICATIONS SERVICE LOCATION USING GLOBAL SATELLITE POSITIONING

CROSS-REFERENCE TO RELATED APPLICATIONS

This is a continuation of application Ser. No. 11/935,749 filed Nov. 6, 2007, which issued on Jan. 12, 2010 as U.S. Pat. No. 7,647,172 which is a continuation of application Ser. No. 11/637,659 filed Dec. 12, 2006, which issued on Nov. 6, 2007 as U.S. Pat. No. 7,292,939, which is a continuation of application Ser. No. 10/445,861 filed May 27, 2003, which issued on Mar. 6, 2007 as U.S. Pat. No. 7,188,027, which is a continuation of application Ser. No. 10/032,853 filed Oct. 25, 2001, which issued on Aug. 3, 2004 as U.S. Pat. No. 6,772,064. All of which are herein incorporated by reference.

BACKGROUND OF THE INVENTION

1. Field of the Invention

The present methods and systems generally relate to processing and transmitting information to facilitate providing service in a telecommunications network. The methods and systems discussed herein more particularly relate to use of global satellite positioning to facilitate processing and transmission of information associated with telecommunications service locations and routing travel between more than one such service location.

2. Description of the Related Art

Efficient and effective customer service is an essential requirement for commercial enterprises to compete successfully in today's business world. In the telecommunications industry, for example, providing customer service is an important part of sustaining market share in view of the many competitors in the industry. Customers whose telephone service, for example, is interrupted or disconnected for even a relatively short period of time may desire to seek an alternative source for service, especially if the interruption or disconnection is not addressed by a quick and effective customer service response.

One important aspect of providing customer service is maintaining accurate and complete knowledge of the customer's location. Computer systems and databases that provide customer addresses often only provide vague references, however, to the exact location of the customer. Such customer addresses typically do not include information of sufficient specificity to permit efficient identification of a service location associated with the customer. In the context of a technician transporting a vehicle to a customer's service location, for example, this lack of sufficient service location information can generate excessive driving time and slow response time. Where the response time is unacceptably high, the lack of sufficient service location information can result in delayed or missed customer commitments. It can be appreciated that such delayed or missed customer commitments can cause a commercial enterprise to lose valuable customers.

What are needed, therefore, are methods and systems for acquiring information associated with a customer's service location. Such methods and systems are needed to obtain, for example, a latitude and longitude associated with the customer's service location. In one aspect, if latitude and longitude information could be collected by a service technician when the customer's service location is visited, those coordinates could then be used to find the customer at a later date. Moreover, if latitude and longitude coordinates could be made available in a database associated with that specific customer, the coordinates could be used to assist in determining the service location of that customer. Such service location information could permit a service technician to drive directly to the customer service location with little or no time lost searching for the service location.

What are also needed are methods and systems for providing a service technician with directions, such as driving directions between two or more service locations. Such directions could be employed to route travel from a first customer service location to a second customer service location. It can be seen that such directions would further reduce the possibility of error in locating a customer service location and thereby enhance customer service response time.

SUMMARY

Methods and systems are provided for obtaining information related to a customer service location. One embodiment of the method includes requesting at least one set of coordinates associated with the customer service location; accessing a technician server to direct a global satellite positioning system to obtain the set of coordinates for the customer service location; obtaining the coordinates and updating one or more databases with the coordinates. The coordinates may include at least one of a latitude and a longitude associated with the customer service location. One embodiment of a system for obtaining information related to a customer service location includes an input device configured for use by a service technician at the customer service location. A technician server is included in the system for receiving data transmissions from the input device. The technician server is in communication with a global positioning satellite system for determining a set of coordinates associated with the input device. Computer-readable media embodiments are also presented in connection with these methods and systems.

In addition, methods and systems are discussed herein for generating directions for a service technician traveling from a first customer service location to at least a second customer service location. One embodiment of the method includes obtaining through a technician server at least one set of "from" coordinates associated with the first customer service location and at least one set of "to" coordinates associated with the second customer location; transmitting the 'from" and "to" coordinates to a mapping system; and, generating directions in the mapping system based on the "to" and the "from" coordinates. One system embodiment includes an input device configured for use by a service technician at a first customer service location. A technician server is provided for receiving data transmissions from the input device. A global positioning satellite system, which is configured for determining at least one set of 'from" coordinates associated with the input device is provided for use on an as needed basis. At least one database is included in the system for storing a "to" set of coordinates associated with the second customer service location and the "from" set of coordinates. The system further includes a mapping system operatively associated with the input device for generating travel directions based on the "from" and "to" coordinates. At least one of the sets of coordinates includes latitude and a longitude data. Computer-readable media embodiments of these methods and systems are also provided.

DETAILED DESCRIPTION

Figure 1:
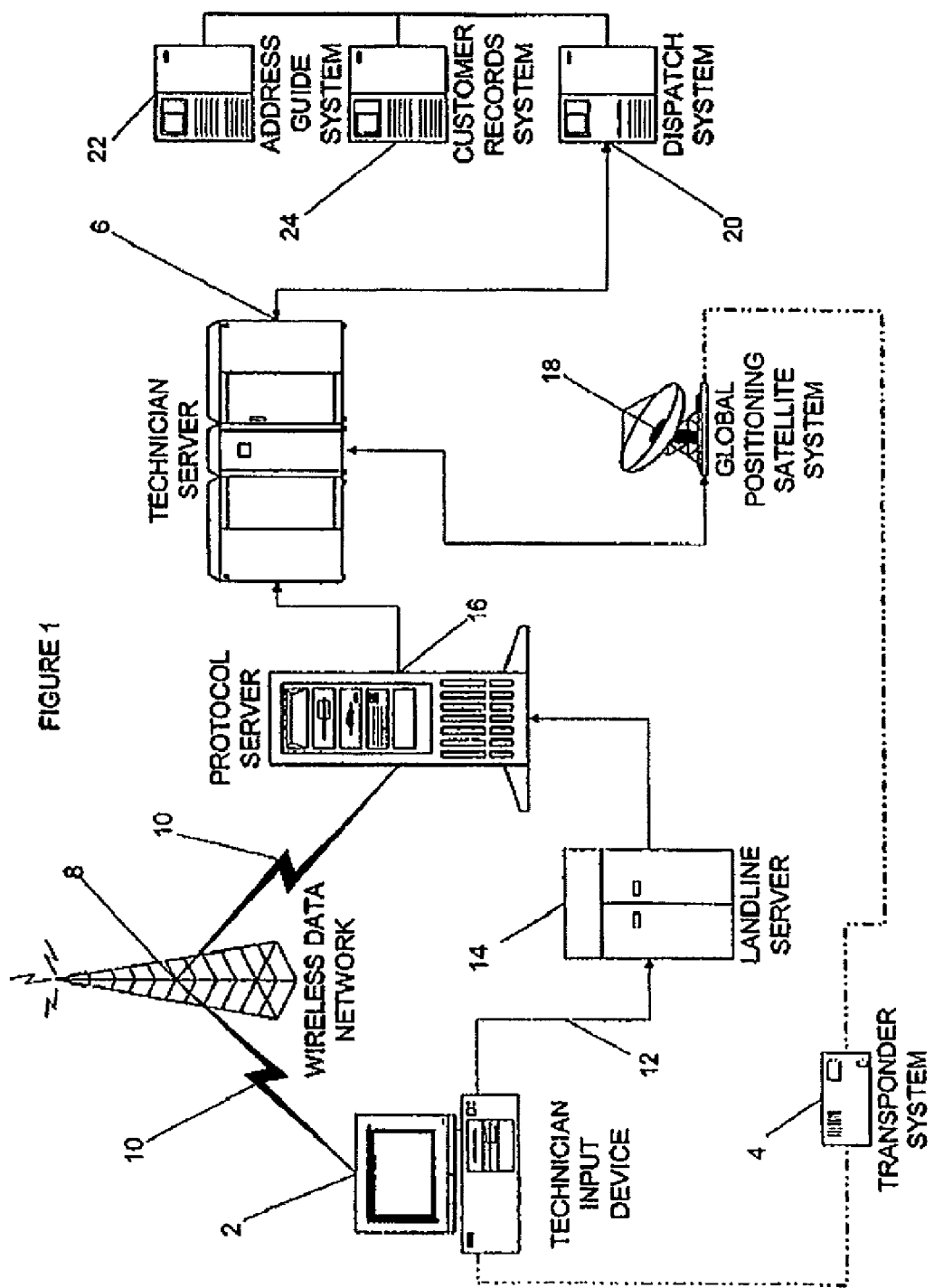
FIG. 1 is a schematic diagram depicting one embodiment of a system for obtaining, processing, and transmitting information related to providing customer service at a customer service location.
Figure 2:
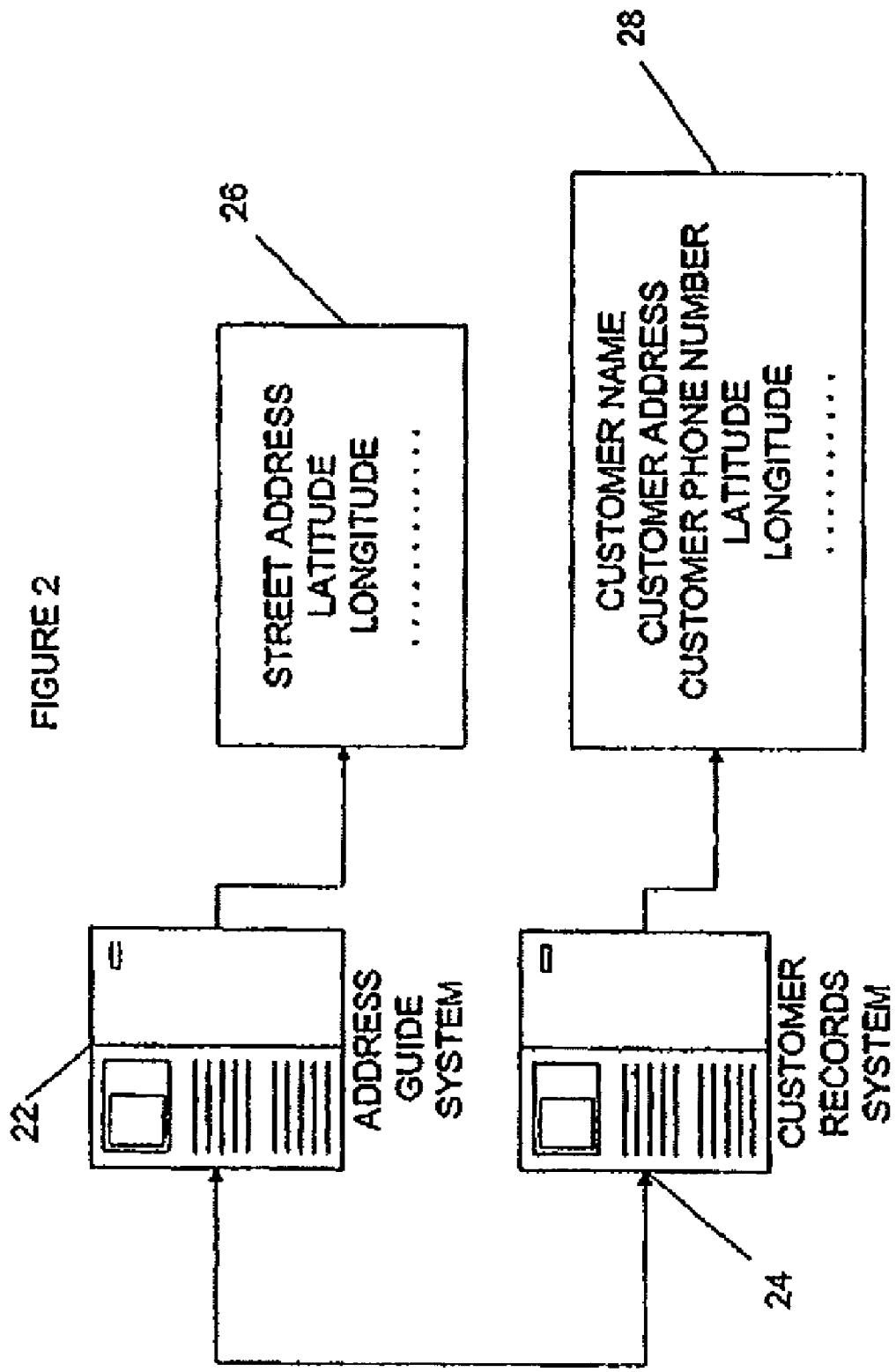
FIG. 2 is a schematic diagram depicting a portion of the system of FIG. 1 in more detail.

Referring now to FIGS. 1 and 2, a service technician visiting a customer service location is provided with a technician input device 2 for receiving and transmitting information related to a disruption or interruption of service at the service location. The input device 2 can be a wireless PC, for example, a laptop, a personal digital assistant (PDA), a wireless pager or any other device suitable for receiving and transmitting data associated with providing service at the customer service location. A transponder system 4 is operatively associated with the input device 2 for receiving and transmitting signals such as satellite transmission signals, for example.

The input device 2 is configured and programmed to permit the service technician to access a technician server 6. As shown in FIG. 1, access to the technician server 6 can be enabled through a wireless data network 8 through a radio connection 10. Access to the technician server can also be enabled by a modem connection 12 through a landline server 14. The landline server 14 can be a server configured in accordance with a server having a CSX 7000 trade designation employed by BellSouth Telecommunications (BST—Atlanta, Ga.).

A protocol server 16 receives and processes communications from both the wireless data network 8 and the landline server 14. In operation of the input device 2, the protocol server 16 processes information transmitted from the input device 2 including, for example, a user ID, a password, a radio serial number, an input device serial number, and other similar data associated with a service technician and service provided at a customer service location. In one aspect, the protocol server 16 can include one or more WINDOWS NT servers (Microsoft Corporation) configured to assign one or more logical ports to transmissions received from the input device 2.

In one aspect of the present methods and systems, the technician server 6 can be a server having a TECHACCESS trade designation (Telcordia Technologies). The technician server 6 can be a conventional server configured and programmed to verify and/or process information received from the input device 2. The technician server 6 functions as a transaction request broker between the protocol server 16 and one or more other systems operatively connected to the technician server 6. The systems operatively associated with the technician server 6 can include, among other possible systems, a global positioning satellite system 18 (GPS system), a dispatch system 20, an address guide system 22, and a customer records system 24.

In one embodiment of the present methods and systems, the GPS system 18 can be configured in accordance with the BellSouth Telecommunications Global Positioning Satellite System (GPS) as implemented by SAIC's Wireless Systems Group (WSG). The GPS system 18 is operatively associated with the transponder system 4 and can be employed to track, dispatch, and monitor service technicians and their input devices at numerous customer service locations. In one aspect, the GPS system 18 interacts with a transponder mounted on a mobile vehicle (not shown) employed by the service technician at a customer service location.

One purpose of the GPS System 18 is to provide supervisors and managers of service technicians with more comprehensive technician activity information. The GPS system 18 can include one or more servers (not shown) and one or more databases (not shown) for transmitting, receiving and storing data associated with satellite communications. In the context of the present methods and systems, the GPS system 18 serves to acquire information associated with a customer service location including, for example, the latitude and longitude coordinates of the customer service location.

The dispatch system 20 serves to receive, process and transmit information related to service required at one or more customer service locations. In one embodiment, the dispatch system 20 includes a server, a database and one or more graphical interfaces for receiving commands from a user. Such commands can include, for example, entry on a graphical user interface (GUI) of customer information and a problem description associated with a particular interruption or disruption of service. The dispatch system 20 communicates with the technician server 6 to process and transmit information related to actions to be performed at a customer service location. Examples of dispatch systems suitable for use in connection with the present methods and systems include the "LMOS," "IDS" and "WAFA" systems of BellSouth Telecommunications.

The address guide system 22 includes a database 26 for storing universal type address information, examples of which are shown in FIG. 2. The address guide system 22 can be considered the keeper of all addresses in the universe of telecommunications services. The address guide system 22 helps to promote valid addresses as customer service locations. For example, if a customer contacts a telecommunications service provider, the customer can be queried for the customer's address. If the customer provides an address of 123 XYZ Street and there is no 123 XYZ Street in the database 26 of the address guide system 22, then a correct address for the customer can be confirmed and entered into the database 26. An example of an address guide system 22 suitable for use in accordance with the present methods and systems is the "RSAG" application of BellSouth Telecommunications.

The customer record system 24 is operatively connected to the address guide system 22 and includes a database 28 for storing customer related information, examples of which are shown in FIG. 2. In one embodiment of the present methods and systems, the customer record system 24 serves to store information related to a particular service location and customer. For example, when telephone service is initially requested by a customer, a record in the database 28 can be populated with information that will create a correspondence between the customer's address and the details of the telephone service to be installed. Records in the database 28 of the customer record system 24 typically remain effective as long as service at a particular address remains the same for that customer. The customer record system 24 interfaces with the dispatch system 20 during the operation of the dispatch system 20 to generate work orders associated with service issues at customer service locations. For example, if problems arise with a customer's service, such as the initial installation order for that service, the dispatch system 20 schedules the work order. The dispatch system 20 draws on information contained in the customer record system 24 to create the dispatch order for a service technician to perform any actions required by the work order.

Figure 3:
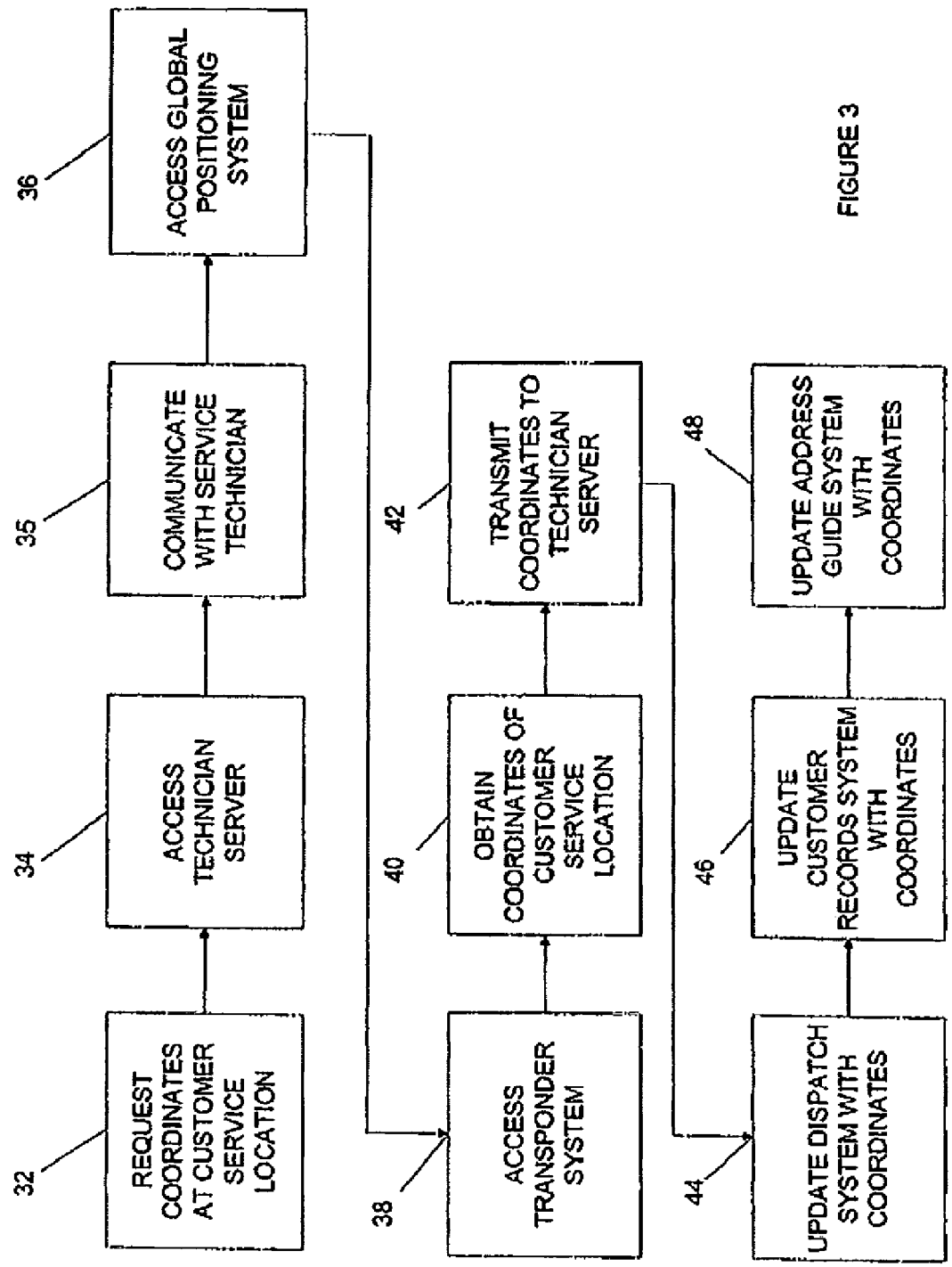
FIG. 3 is a process flow diagram showing one embodiment of a method for obtaining, transmitting and processing information related to providing service at a customer service location.

Referring now to FIGS. 1 through 3, an operative example of the present methods and systems include a service technician at a customer service location with an input device 2. In accordance with the connections described above, in step 32 the technician server 6 can request the coordinates, in terms of latitude and longitude, from the service technician at the customer service location. The request of step 32 can be performed, for example, in step 34 by a job closeout script application of the technician server 6 that is adapted to query the service technician regarding the customers location at the conclusion of a service call. The technician server 6 may check to determine whether a latitude and longitude are already present in the customer's information in the database 28 of the customer record system 24.

The technician server 6 can then instruct the service technician in step 35 to verify his presence at the customer service location. In step 36, the GPS system 18 is accessed, such as through a "Fleet Optimizer" application (BellSouth Technologies) associated with the technician server 6, to obtain latitude and longitude coordinates derived from the location of the service technician's input device 2. In step 38, the GPS system 18 transmits a signal to the transponder system 4 operatively associated with the input device 2 and obtains coordinates of the customer service location in step 40. The GPS system transmits the obtained coordinates to the technician server 6 in step 42. In step 44, the dispatch system 20 is updated with the newly obtained latitude and longitude information. In step 46, the database 28 of the customer records system 24 is updated to reflect this latitude and longitude information. In step 48, the latitude and longitude information is transmitted to and stored in the database 26 associated with the address guide system 22.

It can be seen that just because one has a street address for a customer service location, it does not necessarily follow that locating the customer service location can be readily performed. For example, a street address in Pittsburgh, Pa. might be Three Rivers Stadium Park. If this is the only information available, however, it may be difficult to find the customer service location where work needs to be performed. Use of a GPS system to associate coordinates with a street address permits one to know the position of a customer service location, and hence the location of a service technician performing work at that customer service location.

In another example of the present methods and systems, a new customer requests service installation at ABC Street. Verification is performed to determine that ABC Street is a valid address. If it is a valid address, and if latitude and longitude information has been populated in the address guide system 22, then the information can be used effectively by a service technician to address the customer's needs. In addition, if a service issue later arises with the customer service location, the dispatch system 20 can obtain the customer record, including the customer name, contact number, the type of facilities the customer has, and latitude and longitude information associated with the customer service location. This complete record of information provides enhanced response time for addressing the customer's service needs.

Figure 4:
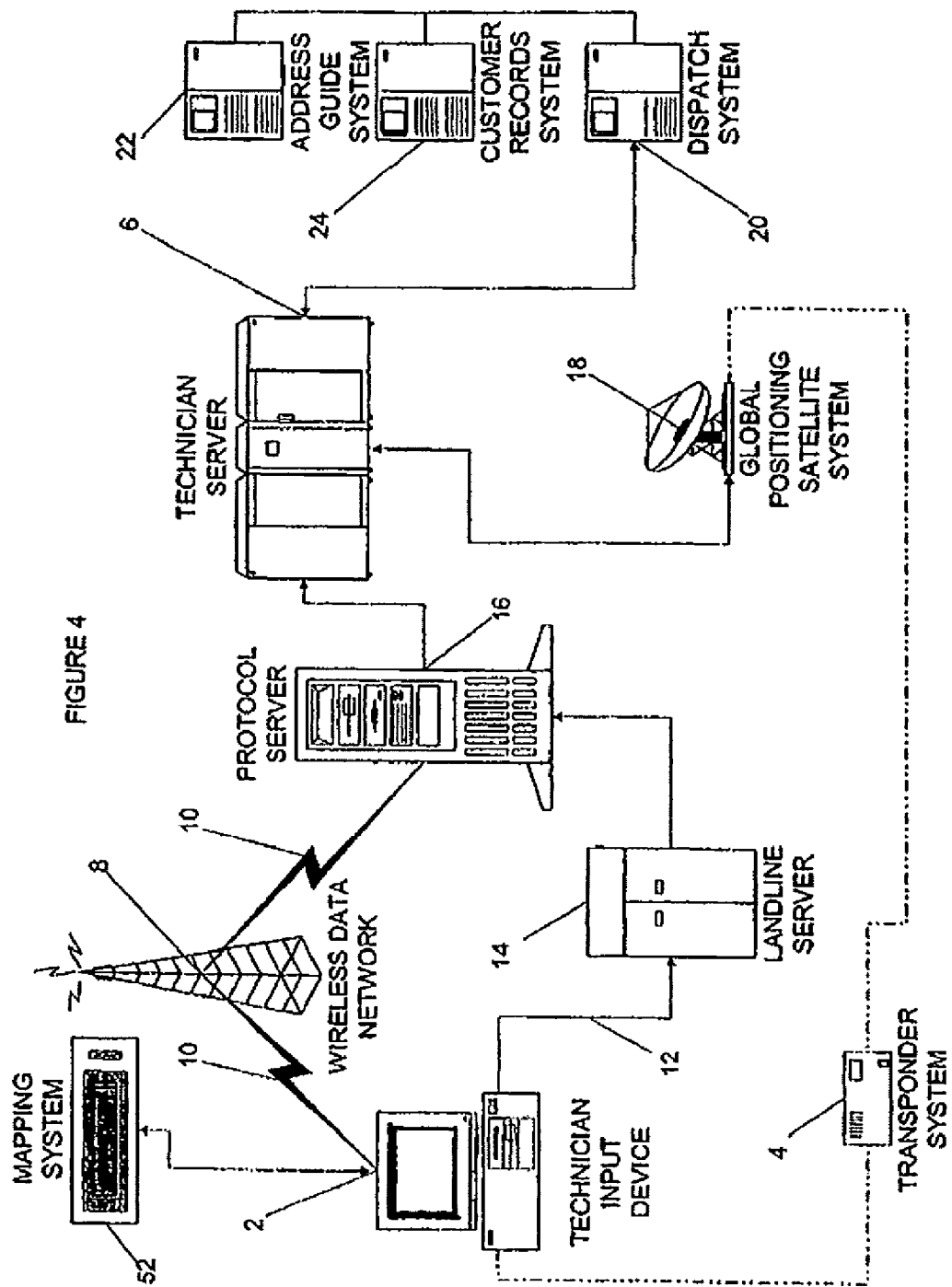
FIG. 4 is a schematic diagram depicting one embodiment of a system for obtaining, processing, and transmitting information related to providing customer service at a customer service location; and, FIG. 5 is a progress flow diagram depicting one embodiment of a method for obtaining, processing, and transmitting information related to providing customer service at a customer service location.

Referring now to FIGS. 4 and 5, in another aspect of the present methods and systems, a mapping system 52 can be provided for routing travel of a service technician between more than one customer service location. The mapping system 52 is configured and programmed to provide travel or routing directions to a service technician from a first location to at least a second location where customer service is to be performed. The mapping system 52 can include conventional mapping software installed on a computer-readable medium operatively associated with the input device. The mapping system 52 can also be accessed remotely, such as through a wireless connection between the mapping system 52 and the input device 2.

In one embodiment, the technician server 6 functions to provide latitude and longitude information to the mapping system 52. This information includes "from" information (i.e., the origin customer service location of the service technician) and "to" information (i.e., the destination customer service location to where travel is desired for the service technician). Before dispatch to the next customer service location, the service technician requests driving instructions in step 62. The technician server 6 queries the "Fleet Optimizer" application, or its functional equivalent, in step 64 to obtain the current customer service location in step 66, which can be used by the mapping system 52 as the 'from" location. If necessary, and in accordance with previous discussion of the present methods and systems, the GPS system 18 can be accessed to obtain 'from" latitude and longitude coordinates in step 68.

The address guide system 22 can then be accessed by the technician server 6 in step 70 to provide the "to" location to the mapping system 52, including latitude and longitude information for the destination customer service location. In step 72, the technician server 6 transmits the "from" and 'to" coordinates to the technician input device 2. In step 74, the mapping system 52 processes the "from" and "to" coordinates. The mapping system 52 can then generate and output driving directions from the "from" location to the "to" location for the service technician in step 76. It can be appreciated that the output of the mapping system 52 including the driving directions can be in any conventional format suitable for communicating the directions to the service technician. For example, the output including the driving directions can be in electronic format or hard copy format.

As discussed above, accurate latitude and longitude coordinates may have already been established for the present or origin customer service location. In the process of dispatching a service technician to a next customer service location, however, it may be necessary to engage the GPS system 18 to obtain these latitude and longitude coordinates. The GPS system 18 can therefore be employed to provide knowledge of one or more service technician locations for various customer service locations where service is required. The GPS system 18 also functions to promote providing correct customer service location information, including latitude and longitude coordinates associated with customer addresses and/or associated critical equipment. It can be seen that algorithms can be applied in the dispatch system 20 and/or the technician server 6 to use this knowledge of service technician whereabouts and customer service locations to facilitate moving the next best or available service technician to the next highest priority or most appropriate service location.

The term "computer-readable medium" is defined herein as understood by those skilled in the art. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Examples presented herein are intended to illustrate potential implementations of the present communication method and system embodiments. It can be appreciated that such examples are intended primarily for purposes of illustration. No particular aspect or aspects of the example method and system embodiments, described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A computer-readable medium for generating travel directions in a communications device, the computer-readable medium storing instructions that, when executed by a processor of the communications device, cause the processor of the communications device to:
    determine a present geographic location of a transponder system operatively associated with the communications device;
    receive, via a user interface of the communications device, information identifying equipment;
    access a remote address guide system to obtain a destination geographic location corresponding to the equipment;
    receive information from the remote address guide system indicating the destination geographic location corresponding to the equipment; and
    obtain travel directions from the present geographic location to the destination geographic location received from the remote address guide system.

2. The computer-readable medium of claim 1, wherein the instructions cause the processor of the communications device to, in accessing the remote address guide system to obtain the destination geographic location, access the remote address guide system by way of a remote technician server and a dispatch system in communication with the remote technician server.

3. The computer-readable medium of claim 1, wherein the instructions cause the processor of the communications device to, in determining the present geographic location of the transponder, access a global satellite positioning system associated with the transponder.

4. The computer-readable medium of claim 1, wherein the instructions cause the processor of the communications device to, in determining the present geographic location of the transponder, access a technician server to obtain the present geographic location.

5. The computer-readable medium of claim 1, wherein the instructions cause the processor to:
    receive a request for the travel directions; and
    in response to receiving the request for travel directions, request identification of the equipment.

6. The computer-readable medium of claim 1, wherein the equipment is service equipment for use in providing customer service.

7. A communications device comprising:
a processor;
a computer-readable medium storing instructions that, when executed by the processor cause the processor to:
    determine a present geographic location of a transponder system operatively associated with the communications device;
    receive, via a user interface of the communications device, information identifying equipment;
    access a remote address guide system to obtain a destination geographic location corresponding to the equipment;
    receive information from the remote address guide system indicating the destination geographic location corresponding to the equipment; and
    obtain travel directions from the present geographic location to the destination geographic location received from the remote address guide system.

8. The communications device of claim 7, wherein the instructions cause the processor of the communications device to, in accessing the remote address guide system to obtain the destination geographic location, access the remote address guide system by way of a remote technician server and a dispatch system in communication with the remote technician server.

9. The communications device of claim 7, wherein the instructions cause the processor of the communications device to, in determining the present geographic location of the transponder, access a global satellite positioning system associated with the communications device.

10. The communications device of claim 7, wherein the instructions cause the processor of the communications device to, in determining the present geographic location of the transponder, access a technician server to obtain the present geographic location.

11. The communications device of claim 7, wherein the instructions cause the processor of the communications device to:
    receive a request for the travel directions; and
    in response to receiving the request for travel directions, request identification of the equipment.

12. The communications device of claim 7, wherein the communications device is of a device type selected from a group of device types consisting of a wireless personal computer, a laptop computer, a personal digital assistant, and a wireless pager.

13. The communications device of claim 7, wherein the equipment is service equipment for use in providing customer service.

14. A method for generating travel directions in a communications device, the method comprising:
    determining a present geographic location of a transponder system operatively associated with the communications device;
    the communications device receiving, via a user interface of the communications device, information identifying equipment;
    the communications device accessing a remote address guide system to obtain a destination geographic location corresponding to the equipment;
    the communications device receiving information from a remote address guide system indicating the destination geographic location corresponding to the equipment; and the communications device obtaining travel directions from the present geographic location to the destination geographic location received from the remote address guide system.

15. The method of claim 14, wherein, in accessing the remote address guide system to obtain the destination geographic location, the communications device accesses the remote address guide system by way of a remote technician server.

16. The method of claim 14, wherein, in accessing the remote address guide system to obtain the destination geographic location, the communications device accesses the remote address guide system by way of a remote technician server and a dispatch system in communication with the remote technician server.

17. The method of claim 14, wherein, in determining the present geographic location of the transponder, the communication device accesses a global satellite positioning system associated with the transponder.

18. The method of claim 14, wherein, in determining the present geographic location of the transponder, the communications device accesses a technician server to obtain the present geographic location.

19. The method of claim 14, further comprising:
receiving a request for the travel directions; and
in response to receiving the request for travel directions, requesting identification of the equipment.

20. The method of claim 14, wherein the equipment is service equipment for use in providing customer service.

* * * * *